July 17, 1956 L. LE FLEM 2,754,725
ORDNANCE STABILIZATION SYSTEM
Filed June 13, 1951
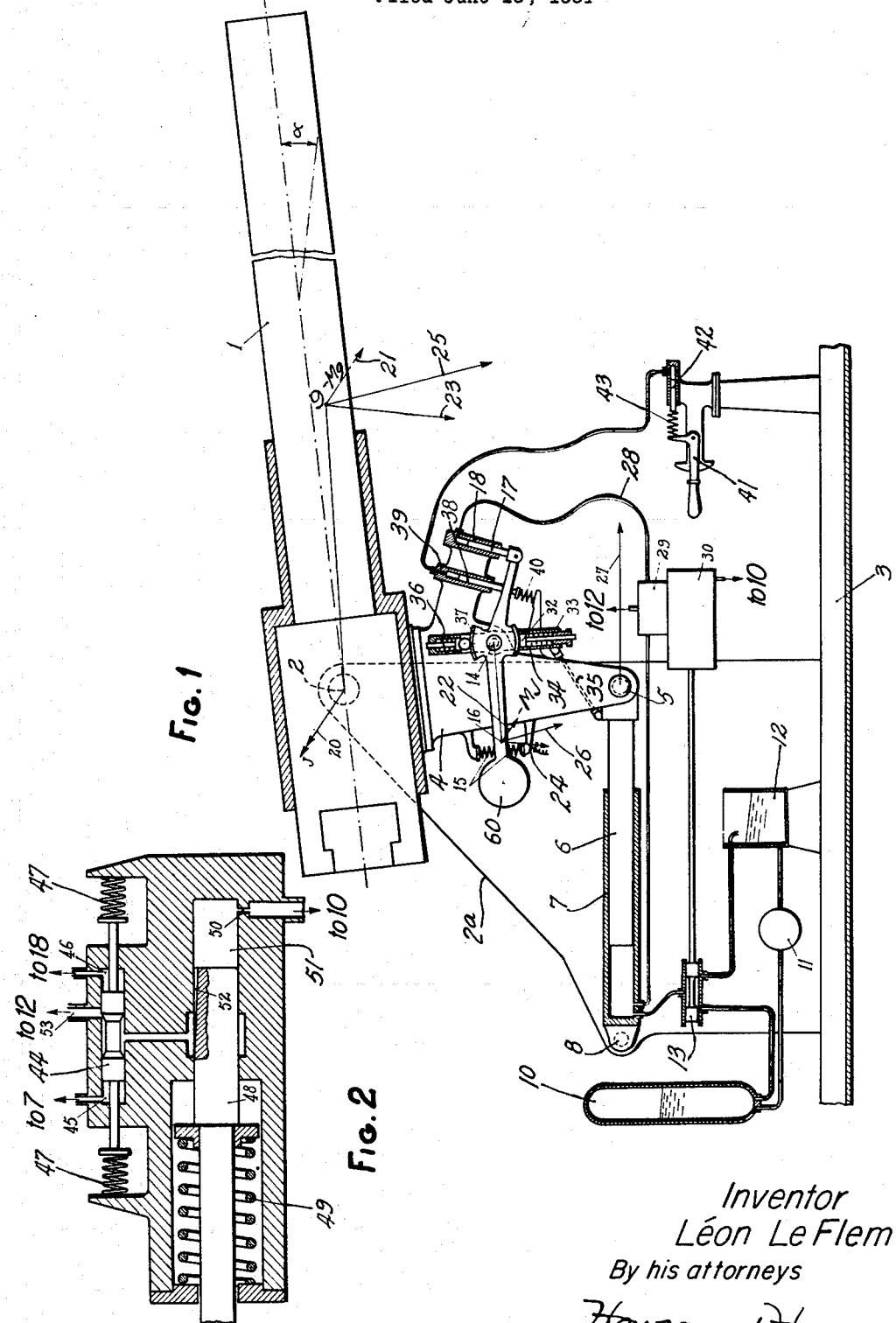
Inventor
Léon Le Flem
By his attorneys
Howson and Howson

United States Patent Office 2,754,725
Patented July 17, 1956

2,754,725
ORDNANCE STABILIZATION SYSTEM

Leon Le Flem, Villeneuve-la-Garenne, France, assignor to Societe Anonyme des Ateliers et Chantiers de la Loire, Paris, France Application June 13, 1951, Serial No. 231,275

Claims priority, application France June 19, 1950

5 Claims. (Cl. 89—37)

This invention relates to the stabilization of a major oscillatory structure, such as apparatus mounted on movable supporting structures for oscillation with respect to said structure about one or more axes, and more particularly to the stabilization of ordnance, military naval or air appliances such as cannon, gunsights, and the like, mounted on ground vehicles, ships or aircraft.

It is an object of this invention to stabilize such a major oscillatory structure whereby it will be allowed to retain a generally fixed pre-selected direction in space during quick displacements of short duration of its supporting structure, such as may occur for example where the said major oscillatory structure is mounted on a land vehicle travelling over rough ground.

Another object is to provide a system for stabilizing the said major oscillatory structure against roll, pitch and/or yaw motion of the vehicle or craft on which the oscillatory structure is mounted.

Another object is to provide improved means for stabilizing an oscillatory structure against disturbing forces and/or accelerations which may be applied to the supporting structure on which said system is mounted.

A more specific object is to provide an improved arrangement for mounting cannon or the like upon a vehicle, craft or other movable supporting structure.

The above and further objects, features and advantages of the invention will appear from the ensuing description of one exemplary embodiment of the invention, as applied to a field-gun mounted on a land vehicle. In the accompanying drawings, Fig. 1 is a diagrammatic general view of the assembly, and Fig. 2 shows a detail of the servo-mechanism.

As shown in the drawings, a gun 1 is mounted in a cradle provided with suitable trunnions 2 journalled in bearings supported on support means such as a gun-carriage 2a mounted on the frame 3 of a vehicle (supporting structure). The cradle of the gun is provided with a bracket 4 having a transverse pivot 5 at its lower end pivoted to the outer end of a hydraulic piston 6 sliding in a cylinder 7, said cylinder being formed with trunnions 8 journalled in a pair of suitable bearings on the carriage.

The assembly including the gun, the cradle and all of the other elements integrally attached thereto constitutes a first or major oscillatory structure having a centre of gravity indicated at 9. With the vehicle at rest the weight of this oscillatory system, which is applied at 9, is balanced by the action of the hydraulic jack 6—7 (first fluid pressure means). Pressure fluid for the hydraulic jack is supplied by a pressure-fluid accumulator 10 into which fluid is continually fed in sufficient amounts by a pump 11 from a reservoir 12. The jack is operated by means of a control valve unit 13 operable selectively to admit fluid into the jack cylinder to raise the gun-chase, or to exhaust fluid from the cylinder to allow the chase to drop.

Mounted on the major oscillatory structure is a minor or auxiliary oscillatory structure 60 journalled at 14, its oscillatory amplitude about the axis 13 being narrowly restricted by a pair of opposing springs 15 constantly urging it into its central position. The centre of gravity of the minor oscillatory structure complete with its accessories is indicated at 16, and the dimensions and weights of the components are so proportioned that the straight line 14—16 is parallel to the line 2—9. The centres of gravity of the respective major and minor oscillatory structures may either be on opposite sides of their respective journal axes, as shown in the drawing, or they may be on the same sides of the respective journals should such an arrangement be found more convenient.

The ratio between the static moments of the two oscillatory structures, which may be, say, of the order of 1000, is herein termed the ratio of similarity. It will generally differ in value from the ratio between the moments of inertia.

When the vehicle is stationary, the weight of the auxiliary oscillatory structure 60 is balanced, in the same manner as in the major structure, by a piston 17 operating in a jack cylinder 18. The piston diameter is so dimensioned that, in the balanced condition, the pressure within cylinder 18 is equal to the pressure in cylinder 7.

Assuming now that the vehicle is moving in a direction parallel to the vertical plane of symmetry of the cannon, and disregarding the passive or frictional resistances and assuming that the major oscillatory system has been stabilized, let J be the acceleration of the main trunnions 2 at a given instant, as indicated by vector 20; since both oscillatory structures are at this time moving in parallel translation owing to the fact that stabilization has been accomplished, they are subjected to forces of inertia MJ and mJ, as indicated by vectors 21 and 22, wherein M and m are the respective masses of the oscillatory structures. The structures are moreover subjected to the action of gravity Mg and mg, indicated at 23 and 24. The forces 21 and 23 have the resultant 25, and the forces 22 and 24 have the resultant 26. The forces 25 and 26 are parallel and their moments relative to their respective axes of oscillation are in a ratio with respect to each other equal to the ratio of similarity between the two oscillatory structures.

In order that a balanced condition should prevail in the major oscillatory structure, or in other words in order that stabilization be assured, it is necessary that the moment of the hydraulic force 27 with respect to the axis 2 should balance the moment of the resultant 25. Now, the pressure necessary to secure this result is the same as the pressure prevailing in the dynamometric cylinder 18, owing to the similarity in the geometry of the two oscillatory structures.

The pressure values in the two cylinders 7 and 18 are transmitted through flexible tubes to a differential detecting or sensing device 29 having a differential detecting or sensing valve 44 (Figure 2) and their differential constitutes the input valve into a servo-mechanism of a conventional control system 30 acting on the distributor valve 13 in the requisite direction to tend to cancel the pressure differential detected at 29.

The detecting and control servo-mechanism arrangements may be electronic, hydraulic or of other character. One exemplary embodiment of a suitable arrangement is shown in Fig. 2, where the detector valve member 44 is subjected at 45 to the pressure in cylinder 7 and at 46 to the pressure in cylinder 18. The valve member 44 is urged towards its central position by a pair of opposing springs 47. A drive piston 48 rigidly connected with the control valve 13 is subjected to the action of a spring 49 on one side and to that of the pressure fluid supplied from an accumulator 10 through a small calibrated port 50 supplying the cylinder 51 on the other side. The pressure fluid flows through a groove 52 provided with a tapering cross section formed in the drive piston and out into the sump 12 through a port 53 which normally is uncovered to a slight extent by the detector valve 44.

The arrangement described operates as follows: Assuming for instance that the pressure in the cylinder 18 is greater than that in the cylinder 7, the detector or senser valve 44 seals off the port 53. The exhaust outlet for the fluid is thus sealed, so that pressure builds up in the cylinder 51 until it approaches the pressure in accumulator 10. The piston 48 therefore compresses spring 49 and acts on the control valve 13 to place cylinder 7 in communication with accumulator 10, thereby raising the pressure in cylinder 7, until the detected pressure differential is cancelled.

In the foregoing explanation the influence of the passive resistances on the major oscillatory structure was disregard. Such resistances however will naturally arise owing to friction between the journals 2 and their bearings, between the pivot 5 and the piston head, and between the piston 6 and the cylinder 7, etc. All such and similar resistances will combine to apply a disturbing couple on the major oscillatory structure in a direction reverse from the direction of the velocity vector. To overcome this disturbing couple, it becomes necessary to apply to the minor oscillatory system a disturbing couple directed in a direction opposite from the one just mentioned and related to the first-mentioned couple in the same ratio as the similarity ratio between the two oscillatory structures. To this end, the minor structure 60 is provided with a sector member cooperating with a friction shoe 32 applied thereagainst by an adjustable spring 33 to exert the desired couple. The friction shoe is mounted in a pivoted support pivoted about the axis 14 and actuated through a link 35 pivoted to the end of the main piston 6 so that the minor disturbing couple will be applied in the desired direction.

Furthermore, it was implicity assumed when determining the balancing couple for the major oscillatory structure, that the force 27 was applied with a constant leverage relatively to the axis 2. However, the leverage will vary slightly owing to the arcuate path described by the point 5 about the axis 2. To correct the resulting error, the oscillating support 34 is provided with a spring-pressed plunger 36 carrying a roller engaging a cam 37 carried by the minor oscillatory structure 60. The force of the spring and the contour of the cam are so predetermined as to exert upon the minor structure 60 a compensating couple effective to compensate for the aforementioned error due to the circular path, with due consideration to the similarity ratio.

It is necessary moreover to provide for the possibility of modifying, when required, the direction in which stabilization is exerted. For this purpose, a corrector piston 38 operating in a cylinder 39 is associated with the auxiliary oscillatory structure 60. This piston 38 is subjected to a hydraulic pressure normally balanced by an opposing spring 40. The cylinder is connected by a flexible tube to a small servo-cylinder containing a spring-pressed piston 42 operable by means of a hand lever 41 arranged on the vehicle at a suitable location within easy reach of the gun-layer. Actuation of this lever will modify the pressure within the cylinder 39 through the relay piston 42 and spring 43. The gun-layer is therefore able, when required, to purposely unbalance the auxiliary oscillatory structure 60, thereby in turn unbalancing the major oscillatory structure, and thus altering the angle α of the gun above the horizontal. After the gun has reached the desired new angle of elevation, the lever 41 is restored to its neutral position.

In the same way, should the major oscillatory structure be subjected to an accidental disturbing or unbalancing factor, such as, say, the adjunction thereto of some additional weight such as a shell inserted into the gun, the gun-layer will merely have to displace the hand lever 41 in order to vary the pressure in cylinder 39 and thus apply to the auxiliary oscillatory structure 60 an appropriate compensating factor.

It will be understood that many modifications may be made in the structural details illustrated and described, and the invention may be applied to uses other than the single illustrative embodiment shown, within the scope of the ensuing claims.

What I claim is:

1. Stabilization system for a major oscillatory structure mounted on a vehicle and normally subjected during the movement of said vehicle to the resultant of external forces due to its weight and inertia comprising, in combination with said major oscillatory structure, support means, said major oscillatory structure being pivotally carried by said support means on an axis of support removed from the center of gravity of said major oscillatory structure, a first fluid pressure means flexibly attached to said fluid pressure means flexibly attached to said major oscillatory structure at a point removed from said axis of support and to said support means for maintaining said major oscillatory structure in a stabilized position about said axis of support, an auxiliary oscillatory structure comprising a weight, pivotally carried by said major oscillatory structure on an axis of support parallel to the axis of support of said major oscillatory structure and removed from the center of gravity of said auxiliary oscillatory structure, the plane determined by the axis of support of said auxiliary oscillatory structure and its center of gravity being parallel to the plane determined by the axis of support of said major oscillatory structure and its center of gravity when said major oscillatory structure is in its stabilized position, elastic means acting to maintain said auxiliary oscillatory structure in a normal position, a second fluid pressure means connected to said auxiliary oscillatory structure and to said major oscillatory structure for detecting differences in the relative positions of said major and auxiliary oscillatory structures, the pressure in said second fluid pressure means being responsive to departures of said auxiliary oscillatory structure from its normal position relative to said major oscillatory structure, and means connecting with said first and second fluid pressure means and responsive to a difference in pressure between said first and second fluid pressure means to alter the pressure in said first fluid pressure means to maintain said major oscillatory structure in its stabilized position.

2. In the combination as claimed in claim 1, means for applying to the auxiliary oscillatory structure, frictional forces proportional to frictional forces acting upon the major oscillatory structure.

3. Stabilization system for a major oscillatory structure mounted on a vehicle and normally subjected during the movements of said vehicle to a resultant of external forces due to the weight and the inertia of said oscillatory structure comprising, in combination with said major oscillatory structure, support means, said major oscillatory structure being pivotally carried by said support means on an axis of support removed from the center of gravity of said major oscillatory structure, an hydraulic jack attached to said support means and to said major oscillatory structure at a point removed from said axis of support, for maintaining said major oscillatory structure in a stabilized position, an auxiliary oscillatory structure pivotally carried by said major oscillatory structure on an axis of support parallel to the axis of support of said major oscillatory structure and removed from the center of gravity of said auxiliary oscillatory structure, the plane determined by the axis of support of said auxiliary oscillatory structure and its center of gravity being parallel to the plane determined by the axis of support of said major oscillatory structure and its center of gravity when said major oscillatory structure is in its stabilized position, elastic means acting to maintain said auxiliary oscillatory structure in a normal position, a dynamometic cylinder, the pressure in said dynamometric cylinder being responsive to the position of said auxiliary oscillatory structure relative to said major oscillatory structure and being equal to the pressure in said hydraulic jack when said major oscillatory structure is in stabilized position, a servo-mechanism responsive to the difference in the pressures in the hydraulic jack and the dynamometric cylinder, and a control valve unit actuated by said servo-mechanism for regulating the fluid pressure in said hydraulic jack to maintain said major oscillatory structure in its stabilized position.

4. Stabilization system as claimed in claim 3, and including means for deliberately changing the position of said auxiliary oscillatory system, thereby to change the pressure in said dynamometric cylinder and induce a pressure differential in said servo-mechanism; whereby the stabilized position of said major oscillatory structure can be changed.

5. Ordnance device comprising support means, a major oscillatory structure pivotally mounted on said support means and including an aimable tube, and a first fluid pressure means, comprising a cylinder and a piston, flexibly connected to said support means and to said tube, whereby said major oscillatory structure may be moved relative to said support means by change of fluid pressure in said cylinder, in combination with an auxiliary oscillatory structure comprising a weight, pivotally supported by said tube, a second fluid pressure means comprising a cylinder and a piston and flexibly connected with said major oscillatory structure and said auxiliary oscillatory structure, the pressure in said auxiliary oscillatory structure being normally equal to the pressure in said first fluid pressure means and responsive to changes in the relative positions of said major and auxiliary oscillatory structures, a pressure differential device, means connecting said pressure differential device with said first and second fluid pressure means and means connected with said pressure differential device for changing the pressure in said first fluid pressure means to equalize said pressure with the pressure in said second fluid pressure means, thereby to counteract relative movement between said major and auxiliary oscillatory structure and retain said tube as originally laid.

References Cited in the file of this patent
UNITED STATES PATENTS

| | | |
|---|---|---|
| 1,238,503 | Fiske et al. | Aug. 28, 1917 |
| 1,296,303 | Manly | Mar. 4, 1919 |
| 1,375,264 | Sundhaussen | Apr. 19, 1921 |
| 1,770,783 | Just et al. | July 15, 1930 |
| 2,193,446 | Caulkins | Mar. 12, 1940 |
| 2,381,161 | Lynn | Aug. 7, 1945 |
| 2,532,334 | Rhyne et al. | Dec. 5, 1950 |
| 2,564,360 | Hammar et al. | Aug. 14, 1951 |